United States Patent [19]

Saganovsky

[11] Patent Number: 5,798,573
[45] Date of Patent: Aug. 25, 1998

[54] SPLIT POWER SUPPLY

[75] Inventor: Abraham Saganovsky, Boca Raton, Fla.

[73] Assignee: KB Electronics, Inc., Coral Springs, Fla.

[21] Appl. No.: 834,709

[22] Filed: Apr. 1, 1997

[51] Int. Cl.$^6$ .................................................. H02J 1/00
[52] U.S. Cl. .................................................. 307/4; 388/819
[58] Field of Search .................... 307/4, 43, 146, 307/154; 318/376, 379, 380; 388/811, 819, 831, 612, 833; 327/334, 530

[56] References Cited

U.S. PATENT DOCUMENTS

| | | | |
|---|---|---|---|
| 3,737,748 | 6/1973 | Teders | 388/819 |
| 3,829,717 | 8/1974 | Harrison . | |
| 3,906,328 | 9/1975 | Wenrich et al. | 388/612 |
| 3,906,338 | 9/1975 | Grindheim . | |
| 4,104,571 | 8/1978 | Gurwicz et al. | 318/380 |
| 4,284,933 | 8/1981 | Galliker et al. | 388/833 |
| 4,333,046 | 6/1982 | Lee . | |
| 4,450,388 | 5/1984 | Markham | 318/376 |
| 4,558,272 | 12/1985 | Grosch | 327/334 |
| 4,603,289 | 7/1986 | McLellan . | |
| 5,077,823 | 12/1991 | Barry et al. | 388/819 |

*Primary Examiner*—Richard T. Elms
*Attorney, Agent, or Firm*—Frishauf, Holtz, Goodman, Langer & Chick

[57] ABSTRACT

A power supply circuit for a control circuit of a motor having an armature, includes a first power supply branch having a series combination of a first resistor, a first diode and a Zener diode connected between a supply of power and a reference potential, with a first junction between the first diode and the Zener diode constituting an output of the first power supply branch which supplies a fixed first current; and a power supply second branch having a series combination of a second resistor, a second diode and a capacitive element connected between the armature of the motor and the reference potential, such that a variable second current in correspondence with current provided by the armature of the motor is provided at a second junction between the second diode and the capacitive circuit, and combined with the first current thereof for supply to the control circuit.

12 Claims, 2 Drawing Sheets

5,798,573

1

SPLIT POWER SUPPLY

BACKGROUND OF THE INVENTION

1. Field of the Invention

The present invention relates generally to power supplies for electronic circuits, and more particularly to a split power supply for a pulse width modulated (PWM) direct current (DC) motor control circuit.

2. Description of the Related Art

A MOSFET PWM chopper circuit (i.e., PWM DC motor control circuit) is commonly used to drive DC motors. One type of MOSFET PWM chopper circuit derives its logic power from a rectified AC line which includes a ballast resistor in series with a zener diode. This is generally an inexpensive method of powering the MOSFET PWM chopper circuit. Alternatively, a transformer can be used. However, this is typically more costly than utilizing the resistor/zener diode combination.

Referring now to FIG. 1, a conventional power supply 2 for providing power to a PWM DC motor control circuit 4 of a motor 6, includes a ballast resistor 8 ($R_B$) in series with a diode 10 (D) and a zener diode 12 ($Z_1$). The ballast resistor 8 is coupled to a voltage source 14 ($V^+$) from, for example, a diode bridge (not shown). A capacitor 16 ($C_F$) is coupled in parallel with zener diode 12. The capacitor preferably stores and provides the output voltage $V_{OUT}$ supplied to the PWM DC motor control circuit 4 for controlling operation of DC motor 6.

However, there is a problem with using the aforementioned ballast resistor 8 and zener diode 12 combination to power the control circuit 4. Specifically, since the current required to drive the PWM DC motor control circuit (particularly the current present at the gate of a power MOSFET, not shown in the circuitry of the control circuit) is proportional to the desired speed of operation of the DC motor, a large amount of heat must be dissipated through the resistor 8, especially when the voltage source 14 is a 230 volt AC line. Typically, when the power MOSFET of the control circuit 4 is in a state of saturation for a relatively long period of time, the control circuit requires very high power for a very high output voltage ($V_{OUT}$). However, when the power MOSFET is in saturation for only a relatively short period of time, the control circuit requires very little power for a low output voltage ($V_{OUT}$).

Since the voltage provided by voltage source 14 is independent of motor speed, the ballast resistor 8 must be able to accommodate the large current required for the PWM DC motor control circuit for high motor speed operation (where $I_1 \approx I_2$). However, for low motor speed, while some current ($I_2$) is supplied to the control circuit 4, a large portion $I_3$ of the remainder of current $I_2$ provided to node 18 is provided to zener diode 12, thereby heavily heating the same.

As a specific example, assume that voltage source 14 is a 120 VAC source (which is equivalent to 108 VRMS) and that, at high motor speed, a current ($I_2$) of 40 mA must be supplied to the control circuit. Thus, a ballast resistor $R_B$ is required as follows:

$$R_B = \frac{108(VRMS) - 15(V_{zener})}{40(ma)} = 2.3K\Omega$$

in which there is a 15 volt drop across zener diode 12. In the high motor speed condition, $I_1$ is substantially equivalent to $I_2$. Therefore, $I_3$ is substantially equivalent to zero.

In view of the foregoing, the power dissipation (in watts) of resistor $R_B$ must be:

2

$$W_{RB} = \frac{(108VRMS)^2}{2.3} = 5W$$

During low speed operation, only about 10 mA of current ($I_2$) is supplied to the control circuit 4, while the remainder of $I_1$ when provided to node 18 is provided to zener diode 12 as $I_3$. This 30 mA of current has the tendency to overheat the zener diode 12.

OBJECTS AND SUMMARY OF THE INVENTION

It is therefore an object of the present invention to provide a power supply design for a PWM DC motor control circuit.

It is a another object of the present invention to provide a power supply for a PWM DC motor control circuit which is self-adjusting in correspondence to the actual power requirements of the PWM DC motor control circuit.

It is still another object of the present invention to provide a split power supply for a PWM DC motor control circuit which uses a primary power supply comprised of the aforementioned resistor-Zener diode combination, and a secondary power supply connected to the output of the primary power supply and which increases the output power in correspondence with the actual power requirements of the PWM DC motor control circuit.

It is yet another object of the present invention to provide a split power supply for a PWM DC motor control circuit which is smaller and less expensive than known power supplies.

It is a further object of the present invention to utilize a resistor-zener diode combination, in which a power supply is self-adjusting in correspondence to the actual power requirements of the PWM DC motor control circuit.

It is still a further object of the present invention to provide a split power supply for a PWM DC motor control circuit which overcomes inherent disadvantages of known power supplies.

In accordance with one form of the present invention, a power supply circuit includes a first power supply branch for providing a fixed current, the first power supply branch having a first resistive element and a first diode operatively coupled between a first voltage source and a reference potential. The power supply circuit also includes a second power supply branch for providing a variable current in correspondence with the voltage induced by the second voltage source. The variable current being added to the fixed current to produce an output current.

In accordance with another form of the present invention, a power supply circuit for a control circuit of a motor having an armature includes a first power supply branch having a first resistive element coupled to a first voltage source, a first diode operatively coupled between the first resistive element and a reference potential, and a first junction between the first resistive element and the first diode. The power supply circuit also includes a second power supply branch having a second resistive element coupled to the armature of the motor, a capacitive element operatively coupled between the second resistive element and the reference potential, and a second junction between the second resistive element and the capacitive element. The second junction is operatively coupled to the first junction such that a current provided through the first resistive element is combined with a current provided through the second resistive element at the second junction, and the second junction forms an output of the power supply circuit for supplying the combined current to the control circuit.

In accordance with another form of the present invention, a method of providing power to a control circuit from a power supply having a first power supply branch including a first resistive element and a first diode operatively coupled between a first voltage source and a reference potential, and a second power supply branch including a second resistive element and a capacitor operatively coupled to a second voltage source and the reference potential, the method including providing a fixed current along the first power supply branch, providing a variable current along the second power supply branch, combining the fixed current to the variable current to generate a supply current and providing the supply current to the control circuit.

The above and other objects, features and advantages of the invention will become readily apparent from the following detailed description thereof which is to be read in connection with the accompanying drawings.

DETAILED DESCRIPTION OF THE INVENTION

Figure 1:
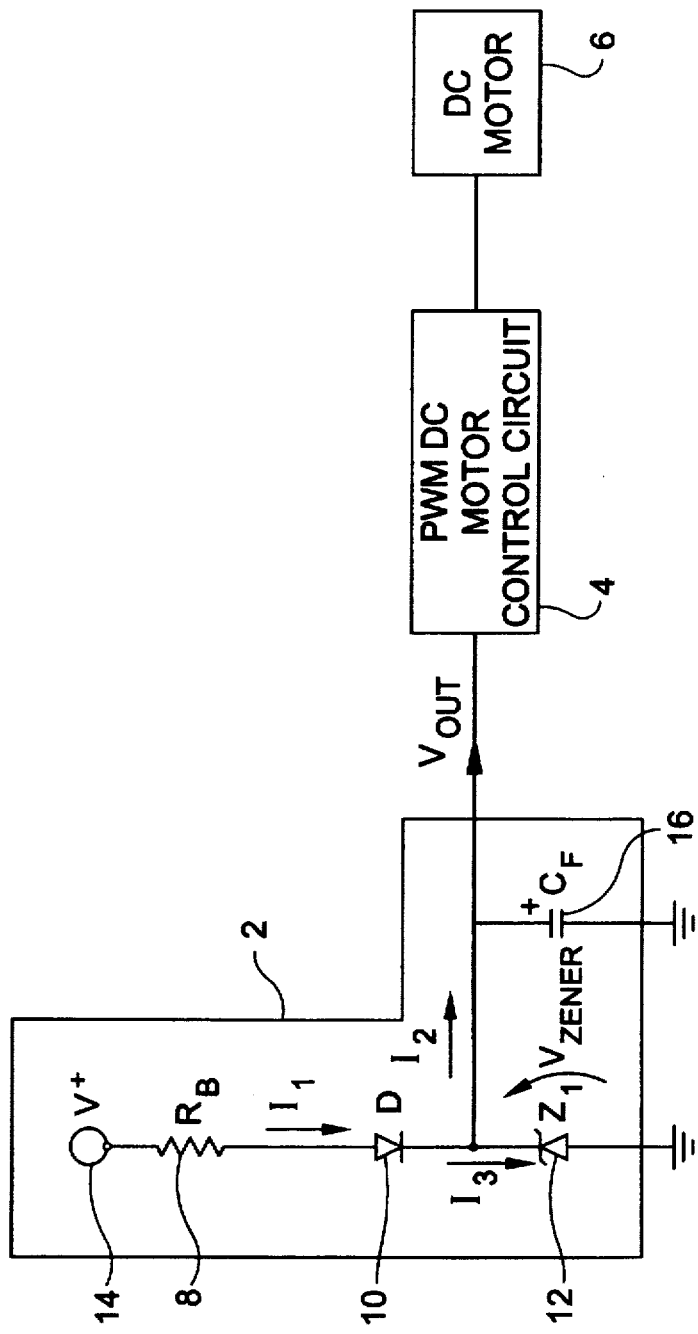
FIG. 1 is a block circuit diagram of a conventional power supply for a PWM DC motor control circuit coupled to a motor control circuit and a DC motor.
Figure 2:
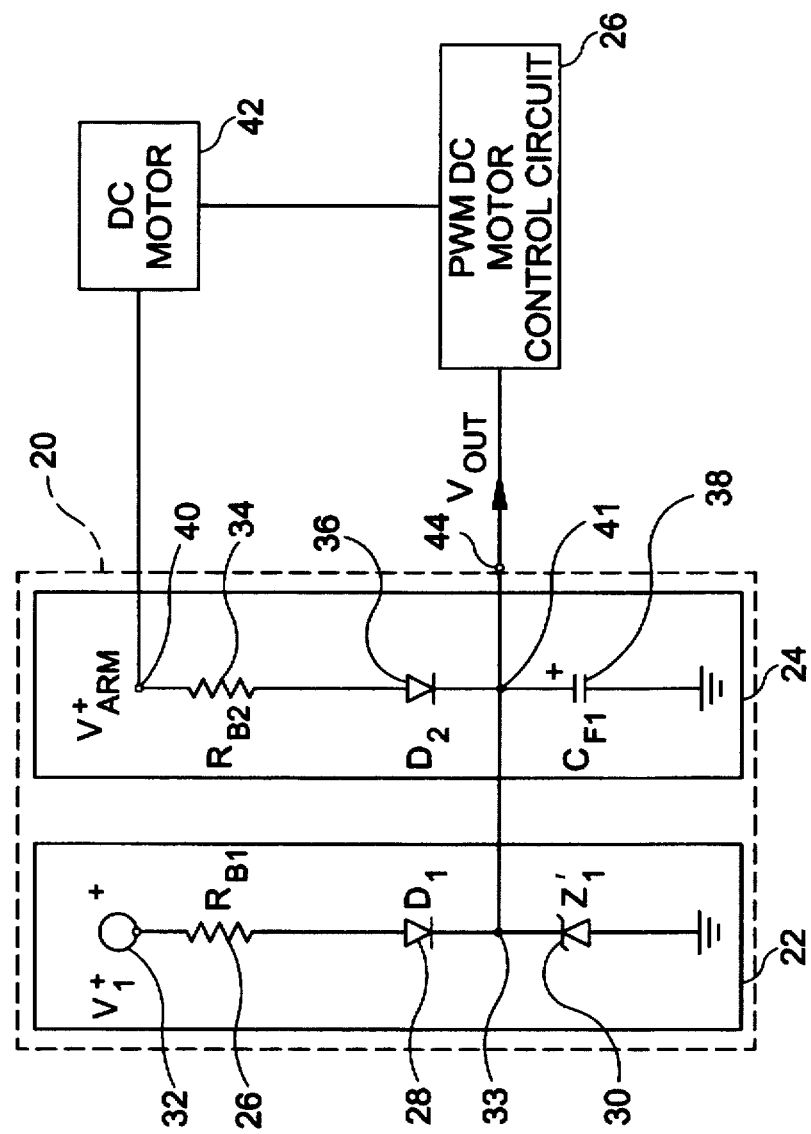
FIG. 2 is a block circuit diagram of the power supply according to the present invention for a PWM DC motor control circuit.

Referring now to FIG. 2 of the drawings, a preferred form of the present invention will be described. The present invention includes a resistor-zener diode combination wherein the output of the power supply self-adjusts in accordance with the actual power requirements of the PWM DC motor control circuit to drive the DC motor at the desired operating rate.

As shown in FIG. 2, the split power supply 20 of the present invention utilizes first and second power supply branches 22, 24 to supply power to PWM DC motor control circuit 26. The first branch 22 preferably includes a series combination of a ballast resistor 26 ($R_{B1}$), a diode 28 ($D_1$) and a zener diode 30 ($Z_1$') operatively coupled between a voltage source 32 ($V_1$) and a zero reference voltage (i.e. common potential). The first power supply branch includes a node 33 between diode 28 and zener diode 30. Diode 28 is oriented such that current will flow from resistor 26 toward node 33.

The split power supply 20 of the present invention also includes a second power supply branch 24 having a series combination of a resistor 34 ($R_{B2}$), diode 36 $D_2$ and a capacitor 38 ($C_{F1}$) connected between a second voltage potential 40 ($V_{ARM}$) and a zero reference voltage (i.e. common potential). The second power supply branch 24 also includes a node 41 between diode 36 and capacitor 38. Diode 36 is oriented such that current will flow from resistor 34 toward node 41. Preferably, node 41 is operatively coupled to node 33 of the first power supply branch. In the preferred embodiment, the second voltage potential 40 ($V_{ARM}$) is operatively coupled to the armature (not shown) of the DC motor 42 under control. By having the second voltage potential 40 coupled to the armature of the DC motor 42, the second power supply branch 24 is self-adjusting to the power requirements of the PWM DC motor control circuit 26 and DC motor 42. Specifically, as the output of the DC motor 42 increases, the current provided by the power supply circuit also increases. In a preferred embodiment, node 41 preferably corresponds to the output port 44 of the power supply circuit 20.

In view of the foregoing and assuming that the minimum current requirement for the control circuit 26 is 20 ma, the value (size) of ballast resistor 26 ($R_{B1}$) is determined as follows:

$$R_{B1} = \frac{108(VDC) - 15(V_{zener})}{20(ma)} = 4.7 K\Omega$$

Thus, the power dissipation across resistor $R_{B1}$ is as follows:

$$W_{RB1} = \frac{(108 VRMS)^2}{4.7} = 2.5W$$

The output current of 20 mA from the first branch 22 at node 33 is supplied to node 41 of the second branch 24.

Assuming an extreme case of 130 VDC to also produce a current of 20 mA in the second branch (i.e., 40 ma total current to the control circuit), that is, 20 mA at $V_{arm}$ (voltage of the armature), then resistor $R_{B2}$ is determined as follows:

$$R_{B2} = \frac{130(VDC) - 15(V_{zener})}{20(ma)} = 5.6 K\Omega$$

Thus, the power dissipation across resistor $R_{B2}$ is as follows:

$$W_{RB2} = \frac{(130 VRMS)^2}{5.6} = 3W$$

The result of this arrangement is that Zener diode (30) never sees a relatively high current. In other words, the power supply circuit 20 of the present invention utilizes the first power supply branch 22 only to power the control circuit 26 under low output conditions of the DC motor 42. However, the power supply circuit also includes a second power supply branch 24 having a second voltage potential which is coupled to the armature of the motor under control so that, as the speed of DC motor 42 increases, the power provided by the second power supply branch 24 (and correspondingly the power supply circuit 20) also increases. As a result, the power supply circuit 20 of the present invention is self-adjusting to the actual power requirements of the control circuit 26.

The present invention enables the power requirements of the power supply circuit 20 to be split between two resistors ($R_{B1}$, $R_{B2}$). More importantly, the present invention allows a relatively small zener diode 30 to be used in the first power supply branch 22, since the zener diode only has to carry the smaller current generated by the first power supply of the first branch. The second power supply branch 24 provides current to the control circuit 26, bypassing zener diode $Z_1$. This permits a small, inexpensive zener diode and relatively small power resistors ($R_{B1}$, $R_{B2}$) to be used.

It will be appreciated that various modifications can be made to the invention within the scope of the claims herein. For example, although a single resistors $R_{B1}$ and $R_{B2}$ have been shown, a plurality of parallel connected resistors can be used. Further, diodes $D_1$ and $D_2$ may be light emitting diodes (LED) which also function to provide an indicating light that power is being supplied through the first branch. In addition, the power supply circuit can be utilized to provide PWM power to not only a DC motor control circuit which controls operation of a DC motor, but also an AC motor control used to power a 3-phase AC induction motor.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention as defined by the appended claims.

What is claimed is:

1. A power supply circuit comprising:

a first power supply branch for providing a fixed current, said first power supply branch including a first resistive element and a first diode operatively coupled between a first voltage source and a reference potential; and a second power supply branch operatively coupled to the first power supply branch, the second power supply branch providing a variable current in correspondence with a current induced by a second voltage source, said variable current being combined with said fixed current to produce an output current.

2. A power supply circuit as defined by claim 1, wherein the first resistive element and the first diode are coupled in series.

3. A power supply circuit as defined by claim 1, wherein the first diode is a zener diode.

4. A power supply circuit as defined by claim 1, wherein said first power supply branch further comprises a second diode operatively coupled to said first resistive element and said first diode, and a first power supply branch output port is operatively positioned at a junction of said second diode and said first diode.

5. A power supply circuit as defined by claim 4, wherein the second diode is coupled in series with the first resistive element.

6. A power supply circuit as defined by claim 1, wherein said second power supply branch further comprises a second resistive element operatively coupled to a capacitor.

7. A power supply circuit as defined by claim 6, wherein the second resistive element and capacitor are operatively coupled between the second voltage source and the reference potential, and wherein said fixed current from said first power supply branch is supplied to a second junction of the second power supply branch between said second resistive element and said capacitor.

8. A power supply circuit as defined by claim 6, said second power supply branch further comprising a third diode operatively coupled to said second resistive element and said capacitor.

9. A power supply circuit as defined by claim 8, wherein said fixed current is operatively combined with said variable current at said second junction of said second power supply branch; and wherein an output port of said power supply circuit is provided at said second junction.

10. A power supply circuit for a control circuit of a motor having an armature, comprising:

a first power supply branch comprising:
a first resistive element coupled to a first voltage source;
a first diode operatively coupled between said first resistive element and a reference potential; and
a first junction between said first resistive element and said first diode; and a second power supply branch comprising:
a second resistive element coupled to said armature of said motor;
a capacitive element operatively coupled between said second resistive element and said reference potential; and
a second junction between said second resistive element and said capacitive element, said second junction being operatively coupled to said first junction such that a current provided by said first resistive circuit is combined with a current provided by said second resistive circuit at said second junction, said second junction forming an output port of said power supply for supplying the combined current to said control circuit.

11. A method of providing power to a control circuit from a power supply having a first power supply branch including a first resistive element and a first diode operatively coupled between a first voltage source and a reference potential, and a second power supply branch including a second resistive element and a capacitor operatively coupled to a second voltage source and the reference potential, the method comprising the steps of:

a) providing a fixed current along the first power supply branch;
b) providing a variable current along the second power supply branch;
c) combining the fixed current to the variable current to generate a supply current; and
d) providing the supply current to the control circuit.

12. The method of providing power to a control circuit as defined by claim 11, wherein prior to step b), the method further comprises the step of:

varying a voltage provided by the second voltage source to change the variable current provided along the second power supply branch.

* * * * *